Nov. 7, 1933.  A. G. GAGE  1,933,848
VALVE ACTUATING DEVICE
Filed Aug. 29, 1928   4 Sheets-Sheet 1
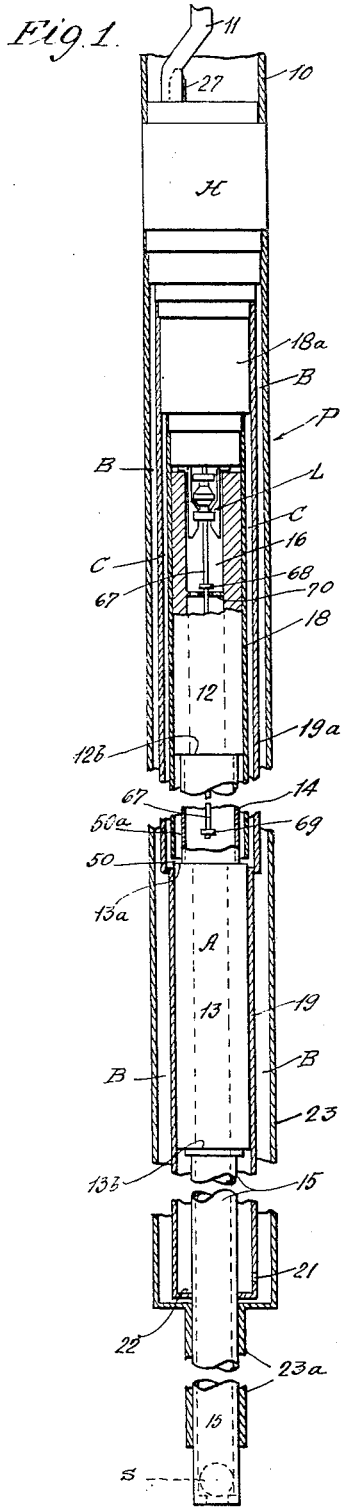
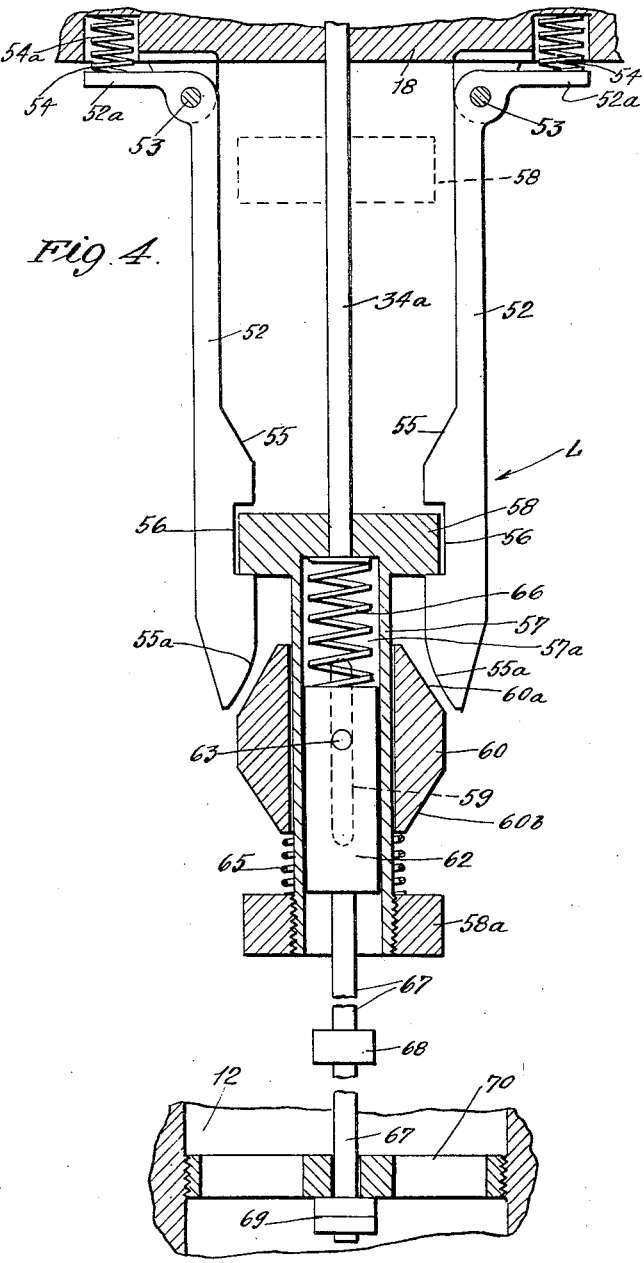
Inventor.
Arthur G. Gage.
Attorney.

Nov. 7, 1933.                A. G. GAGE                1,933,848
                       VALVE ACTUATING DEVICE
                      Filed Aug. 29, 1928        4 Sheets-Sheet 2
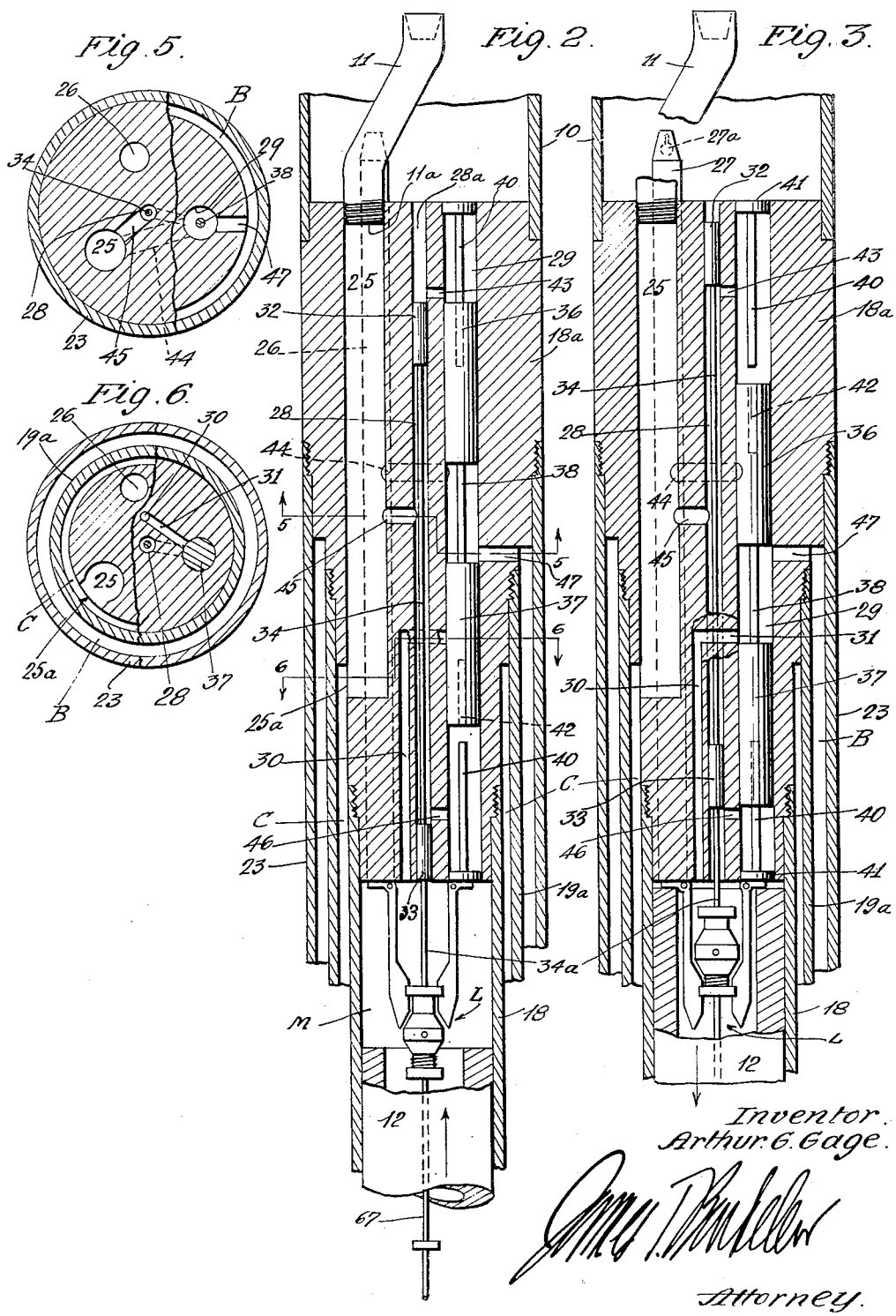
Inventor.
Arthur G. Gage.
Attorney.

Nov. 7, 1933.   A. G. GAGE   1,933,848
VALVE ACTUATING DEVICE
Filed Aug. 29, 1928   4 Sheets-Sheet 3
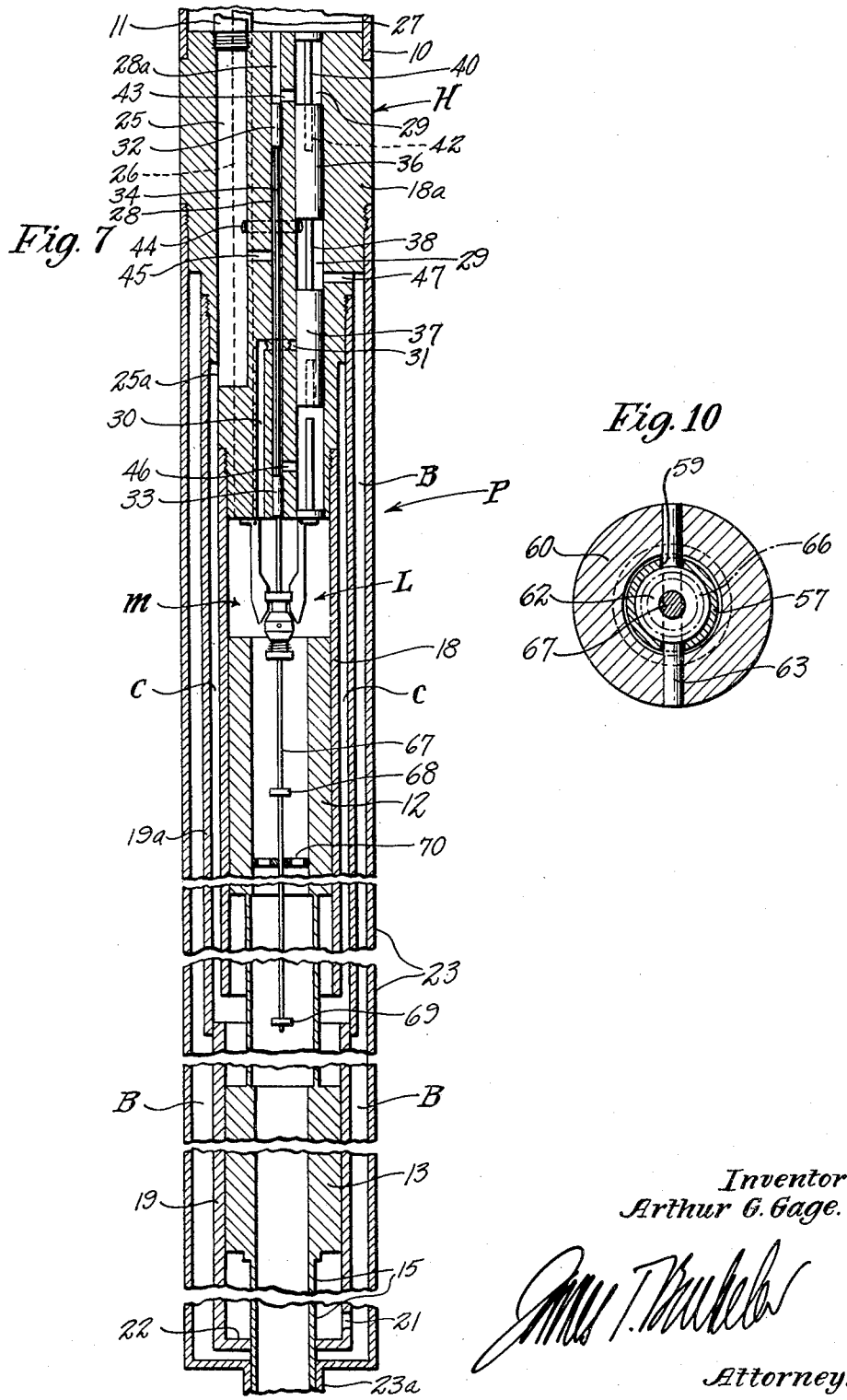
Inventor
Arthur G. Gage.
Attorney.

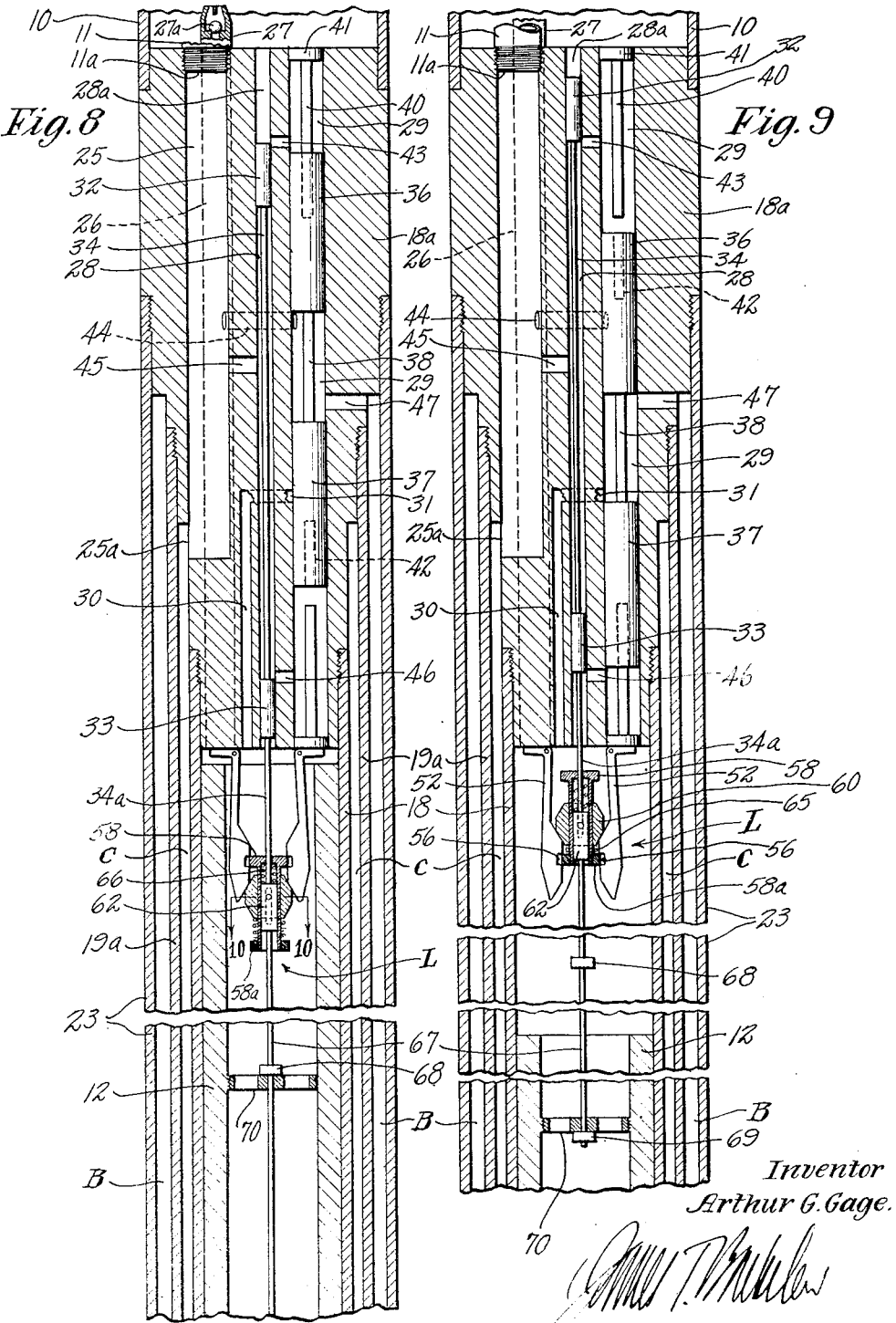

Patented Nov. 7, 1933

1,933,848

UNITED STATES PATENT OFFICE 1,933,848

VALVE ACTUATING DEVICE

Arthur G. Gage, Los Angeles, Calif.

Application August 29, 1928. Serial No. 302,737

20 Claims. (Cl. 121—157)

This invention has to do generally with valve actuating devices, and is particularly concerned with a latch device of this character for use in well pumps.

The present device may be considered as being applicable to numerous types of oil well pumps wherein the pump valve parts are caused to move between predetermined limits in accordance with the movements of a plunger between certain limits. The invention embodies means not only for positively actuating the valve parts, but also for locking them in place when moved into their operating positions.

I have provided a type of pump in which the present device may advantageously be used, and have embodied in the pump preferred types of valve and plunger parts. I have shown and will describe the preferred form of valve and plunger parts, however, only for the purpose of illustrating a typical instance of application of the present valve actuating device, and it will be understood that I do not limit the invention to the hereinafter described pump and that it may be adapted for use in various types of pumps of this general character.

Numerous features and advantages of the invention will be most readily and clearly understood from the following detailed description of a preferred embodiment thereof, reference being made throughout the description to the annexed drawings, in which:

Fig. 1 is an elevation of the pump, certain parts being shown in section;

Fig. 2 is a vertical section through the valve head, the valve actuating latch being shown in elevation, certain valve parts shown, for purposes of illustration, as being in a single vertical plane, and the valve parts illustrated in position at the end of the plunger "down" stroke;

Fig. 3 is a view similar to Fig. 2 showing the valve parts in position at the end of the plunger "up" stroke;

Fig. 4 is an enlarged detailed elevation of the valve actuating latch, certain parts being shown in section;

Fig. 5 is a horizontal section on line 5—5 of Fig. 2 showing the true positions of the bores;

Fig. 6 is a section similar to Fig. 5 taken on line 6—6 of Fig. 2.

Fig. 7 is a view generally similar to Fig. 1, but in enlarged scale, showing the entire pump in section, the plunger in this view being illustrated in intermediate position and the valve locking device in its lower position;

Fig. 8 is a view similar to Fig. 2, showing the valve locking device at substantially the point of release during upward movement of the plunger;

Fig. 9 is similar to Fig. 8, and shows the valve locking device at substantially the point of release toward the end of downward movement of the plunger; and Fig. 10 is a fragmentary enlarged section on line 10—10 of Fig. 8.

The illustrated pump may be classified as being of a fluid pressure actuated type adapted to be submerged beneath the standing level of oil within the well, and actuated by means of high pressure fluid delivered to the pump at the ground level. Referring particularly to Fig. 1, the pump, generally indicated at P, is suspended from the lower extremity of the usual pipe string 10, into which the pump is adapted to discharge oil upwardly and out of the well. The pump is provided at its upper end with a valve containing head H, and has a lower pumping or plunger portion, indicated at A, the valve actuating latch L being placed between the valve head and the plunger.

The plunger is seen to embody an upper head 12 and a lower head 13 of relatively greater diameter, heads 12 and 13 having an interconnecting trunk 14, and a bottom section 15 depending from and extending a suitable distance below the lower plunger head. The upper plunger head 12 is provided with a central bore 16 that opens downwardly into bores in sections 14 and 15 and in the lower head 13, section 15 having at its lower end a foot valve S.

The upper plunger head is contained within a barrel 18, mounted on the valve head body 18a and extending downwardly to terminate at a point somewhat above the upper end face 13a of the lower head when the latter is in its uppermost position, so as to permit fluid passage at 50 between head 13 and the end of barrel 18. Extending concentrically around the upper plunger barrel is a lower plunger barrel 19, depending from the valve head body as shown and extending downwardly a distance such that head 13, in its lowermost position, covers port 21 in the lower plunger head barrel. Barrel 19 is provided with an end closure 22 and is of increased diameter through its upper extent 19a so as to provide suitable clearance from barrel 18. Extending concentrically around barrels 18 and 19, and spaced from the latter, is an outer enclosing pipe 23 having a lower portion 23a of relatively small diameter and within which the lower plunger stem 15 has a sliding fit.

It will suffice to note at this point that the plunger assembly is adapted to move vertically in barrels 18 and 19 and to discharge the pumped liquid upward through the valve head H into the pipe string 10. When the plunger assembly moves downward, well liquid is permitted to rise through foot valve S into the plunger bore and into the chamber between the upper head 12 and the valve head body 18a.

It will be unnecessary, in the present application, to enter into a prolonged description of the operation of the plunger assembly, since the details of this part of the pump structure comprise no part of the present invention, but rather the subject matter of my two copending applications on Oil well pump, Ser. No. 109,098, filed May 14, 1926, allowed Jan. 22, 1932 and Well pump, Ser. No. 378,923, filed July 17, 1929, allowed March 24, 1932.

Referring to Figs. 2 and 3, the valve head body 18a is seen to be drilled longitudinally to provide a plurality of fluid passageways and valve containing bores. A high pressure fluid conduit 11, extending downward from the ground level within the pipe string, opens at 11a into a passage 25 which extends within the head to open, at 25a, into the annular space C between barrels 18 and 19a. A second passage 26 extends throughout the head, opening at its lower end into the chamber above the upper plunger head 12, a nipple 27 containing a check valve 27a being threaded into the passage at its upper end. Pilot valve bore 28 and a master valve bore 29 also extend through the head, the latter bore being of larger diameter than the pilot valve bore as shown. Fluid passage 30 extends upwardly from the lower end of the valve head, and communicates with the master valve bore through passage 31.

A vertically movable pilot valve is contained within bore 28 and is provided with upper and lower plunger heads 32 and 33, respectively, these heads having a common valve stem 34. Plunger 33 has a lower depending valve stem 34a through which the pilot valve is adapted to be actuated as will later be explained. Bore 29 contains a master valve having upper and lower plunger heads 36 and 37, respectively, interconnected by valve stem 38. Vertical movement of the master valve is limited by means of stops 40, mounted on plugs 41 and adapted to project loosely into bores 42 in the upper and lower plunger heads.

Communication is established between the pilot valve and master valve bores by means of passages 43, and 46, these passages opening into the bores near their upper and lower ends respectively. A high pressure fluid opening 44 extends between passage 26 and the master valve bore at a point somewhat above passage 47 which extends from bore 29 into the annular space B between barrel 19a and the outer pipe 23. The high pressure fluid passage 25 communicates with the pilot valve bore through a centrally located opening 45.

It will be seen that in the valve position shown in Fig. 2, the upper end of the master valve bore is through port 43, in communication with the upper end 28a of the pilot valve bore which opens into the well pipe 10, and that when the valves are moved to the position of Fig. 3, bore 29 communicates with passage 25 through port 43, pilot valve bore 28 under the pilot valve plunger 32, and opening 45. Similarly with the master valve in raised position, passage 47 communicates with passage 25 through port 44 and bore 29 between the two heads of the master valve, and is in communication with bore 30 through bore 29 and passage 31 when the master valve is in its lower position.

I will now describe the operation of the valve head parts in conjunction with the operation of the plunger, assuming first that the pilot valve is adapted to be moved from the position of Fig. 2 to that of Fig. 3 by actuating the lower valve stem 34a, and assuming that the pump plunger P is in its lowermost position, or, in other words, at the beginning of its pumping stroke. High pressure fluid admitted to passage 25 through conduit 11 is discharged through opening 25a into the annular space C at all times, and into the annular chamber 50a (see Fig. 1) through the clearance space 50 between the lower end of barrel 18 and the upper end 13a of the lower plunger head 13.

The master valve is held in its upper position by virtue of the high pressure fluid acting on its lower end through opening 45 and port 46 and the pilot valve bore, thus permitting the actuating fluid to flow through port 44 into space B. From space B the high pressure fluid flows through openings 21, exerting pressure on the lower face 13b of plunger head 13 sufficient to raise the plunger assembly, foot valve S remaining closed throughout the pumping stroke of the plunger. Well liquid previously admitted through foot valve S and the plunger bore into the chamber above the upper plunger head 16, is forced upwardly through discharge fluid passage 26, nipple 27 containing check valve 27a, into the pipe string 10, valve 27a closing at the completion of the plunger pumping stroke. Due to the fact that the actuating fluid is under high pressure and acts on the annular surface 13b of comparatively small area, a column of liquid having a comparatively large cross section area, (that corresponding to the internal cross section area of barrel 18), is discharged by the pump, the ratio of the volume of actuating fluid used in moving the plunger throughout its stroke to the volume of pumped liquid being determined, of course, by the ratio of the area of face 13b to the cross section area of the displacement chamber.

Assuming that the pilot valve is raised to the position of Fig. 3 at the end of the plunger pumping stroke, high pressure fluid is admitted through port 43 and passage 45 to the upper end of the master valve bore, exerting pressure on the upper end of the master valve plunger 36 and causing the valve to move downward to the position shown in Fig. 3. It will be noted that the pilot valve must necessarily move to substantially the limits of its upward or downward strokes before ports 43 and 46, respectively, are opened, and that the master valve in either case, remains stationary until the pilot valve substantially reaches the limit of its stroke. Pounding of the master valve at the end of this movement is prevented by the plunger-like action of the lower stop 40 in the bore of head 37. Fluid previously contained in the bore below the lower plunger 37 is discharged through port 46 into the pumping chamber. Due to the fact that the upper annular face 13a of the lower pump plunger head 13 is of relatively greater area than the lower annular face 12b of head 12, a positive resultant downward pressure on an area equal to the difference in areas of plunger faces 13a and 12b, is exerted by the actuating fluid through openings 25a, space C and opening 50, causing the plunger assembly to move downward on its suction stroke. During this movement valve S opens to allow oil from the well to flow upward through the plunger. Also during the suction stroke of the plunger, the actuating fluid remaining in barrel 19 below head 13, is forced into space B and thence flows through passage 47 in the valve head, through the master valve bore between heads 36 and 37, through port 31 and downward into the displacement chamber.

The actuating fluid used preferably is clean oil freed from particles of sand and maintained at pressure greater at all times than that of the pumped oil. It will be noted that by virtue of the use of clean high pressure actuating fluid, certain plunger parts of the pump are insured against destruction by the abrasive action of sand carried in the well oil. Thus it is seen that the lower plunger 33 of the pilot valve in the position of Fig. 2 is exposed to well oil under pressure tending to force its way upward between the plunger and the pilot valve bore wall. The actuating fluid pressing downwardly on the upper end of valve plunger 33, however, is under pressure greater than that of the well oil at all times, the difference being sufficient to cause any leakage between the plunger and the bore wall to wash the cylindrical face of the plunger free of all sand particles. The upper pilot valve plunger 32 is similarly kept free from abrasive particles.

It will be seen that the master valve plunger heads are at no time brought into direct contact with the well or pumped oil. The space around stem 38 and between the heads is at all times in contact with clean oil either being forced into space B during the pump plunger up stroke, or from space B into the pumping chamber during its down stroke. The outer ends of plunger heads 36 and 37 are intermittently exposed to clean oil forced through ports 43 and 46, this oil being subsequently returned to the pilot valve bores through these ports.

The actuating fluid serves in a manner similar to that described with reference to the pilot valve heads, to free the pump plunger heads 12 and 13 from abrasive particles in that whatever leakage flows from space 50a between the heads and barrels 18 and 19, respectively, serves to exclude the well oil from the cylindrical head surfaces. Therefore, even though the well oil be heavily loaded with sand, the plunger heads are kept clean at all times.

As has been explained, all clean oil used in moving the pump plunger through its pressure stroke is discharged into the pumping chamber M, and to that extent decreases the sand to oil ratio of the well oil body. Inasmuch as well oil often carries sand in such quantities or proportions as to prohibit its being pumped in that condition, it becomes necessary that the well oil be mixed with a sand free oil to effect its pumping. Therefore, since in the operation of the present pump clean oil is mixed with the well oil in chamber M in substantial amount (depending upon the actuating oil to pumped oil ratio) it will be seen that the pump operates successfully on oil sanded in practically any proportion.

A typical form of plunger and valve action having now been described, it will be seen that the operation of the device is dependent upon proper movement of the pilot valve in accordance with the movement of the pump plunger. And the valve actuating latch having previously been mentioned as being adapted generally to use under such conditions of valve and plunger movement, the application of the present latch to the described valve and pumping mechanism is to be considered as typical only.

I will now describe the valve actuating latch device L shown in detail in Fig. 4. A pair of latch arms 52 pivotally mounted at 53 on the under side of the valve head body 18, and having toe portions 52a, are urged radially inward in an axial plane of the pilot valve stem 34a, by means of coil springs 54 placed in recesses 54a in the valve head and bearing against the toe portions 52a. The arms are provided with oppositely inclined cam engaging faces 55 and 55a, and have notches 56 midway between the inclined faces, as shown.

Mounted on the lower end of stem 34a is a sleeve 57, having a bore 57a, and upper and lower detent flanges 58 and 58a respectively. Slidably mounted on sleeve 57 is an annular spreader cam 60 having upwardly pointing cam faces 60a and downwardly pointing cam faces 60b, these faces preferably being conically shaped. A cylindrical block 62 extends within the sleeve bore 57a and is fixed to cam 60 by means of a pin 63 extending through the block and through longitudinal slots 59 in the sleeve, and terminating in the cam. A spring 65 is placed around the collar to bear on the lower end of the spreader cam and flange 58a as shown, and a second spring 66 is confined between the end of the bore 57 and the upper end of block 62, the combined effect of these springs being to counterbalance one another when the device is in a position corresponding to that of Fig. 4. Depending from the lower end of block 62 is an elongated stem 67 having upper and lower lugs 68 and 69, respectively, the distance between these lugs being somewhat less than the length of stroke of plunger head 13. A yoke 70 is provided in the bore of head 12 and is adapted to engage lugs 68 and 69 to actuate the valve controlling latch in a manner that will now be described.

As the plunger is moved upward from its lowermost position, corresponding to the position of spider 70 illustrated in Fig. 4, and toward the end of the upward plunger travel, the spider engages the upper lug 68 on rod 67 to move block 62 and therefore spider cam 60, upward relative to sleeve 57. Engagement of spider 70 with lugs 68 first results in the upper cam faces 60a being brought into engagement with the lower faces 55a of the latch arms, causing the arms to be spread apart to release the flange 58 from confinement within notches 56. In Fig. 8, I have illustrated the relative positions of the cam and latch arms at substantially the point of release of flange 58. At the point of release, spring 66, having been compressed by the upward movement of block 62, causes the sleeve 57, rod 34a and the pilot valve, to be suddenly thrust upward, the parts of the locking device L returning to substantially their original relative positions. The entire latch assembly, together with the pilot valve, now moves upward under the influence of the plunger, that is to say, after the latch has been released, the plunger itself carries the locking device and pilot valve to their uppermost positions shown in Fig. 3. During this time, and when cam 60 has moved upward by the arms 52 until the inclined arm faces 55 are brought into engagement with cam faces 60b, the arms are moved readily inward by means of springs 54 to bear against the sides of flange 55a, and upon further upward movement of the sleeve, the arms 52 close about the flange 55a to hold the latter in notches 56.

As I have stated, after flange 58 has been released from notches 56 and the former suddenly thrust upward by the action of spring 66, further movement of the pilot valve to its uppermost position is effected by the plunger. Even though the plunger travel should be somewhat slow during the end portion of the upward stroke of the plunger after release of the pilot valve, and the pilot valve moved correspondingly slow, stalling of the pump due to the pilot valve being in intermediate positions during this interval, cannot occur because the valve must move to substantially the end of its stroke to uncover port 43 before the master valve is moved downward to reverse the flow of high pressure fluid to the plunger. And until the master valve is moved downward to close port 44, the plunger will continue in its upward movement.

As the pump plunger nears the lower limit of its down stroke, yoke 70 engages lug 69, the pilot valve is released and the locking device caused to move in a series of operations the reverse of those described above. Thus, the cam 60 is first brought into engagement with surfaces 55 of the latch arms to spread the latter sufficiently to release flange 58a. The positions of the parts at substantially the point of release during downward plunger travel, are shown in Fig. 9. Before release of flange 58a from notches 56, spring 65 is compressed, and after release, the spring acts to suddenly thrust sleeve 57 and the pilot valve downward a fraction of their total movement to the position of Fig. 2. The plunger then carries the pilot valve and latch assembly down to the point at which flange 58 is retained within notches 56 to lock the valve in its lower position.

As I have previously stated, the fact that the pilot valve is not completely thrown to changed position immediately after release of the latch, in no way effects or prevents positive action of the pump. The application of high pressure to the plunger to reverse its stroke, cannot occur until the pilot valve reaches its uppermost or lowermost positions, as the case may be. And until the high pressure fluid is reversed in its application to the plunger, the latter will continue its travel, and will carry with it the pilot valve to the point at which the pilot valve will reverse the pressure applied to the master valve to throw the latter completely to changed position. The importance of the locking device resides in its ability to positively hold the pilot valve in its two positions at the ends of its travel.

It will be understood the drawings and description are to be considered merely as illustrative of and not restrictive on the broader claims appended hereto, for various changes in design, structure and arrangement may be made without departing from the spirit and scope of said claims.

I claim:

1. A valve actuating device of the character described embodying a pair of oppositely disposed and downwardly extending arms mounted at their upper ends on an arm supporting body and adapted yieldingly to resist lateral displacement, said arms having a pair of oppositely disposed notches, one each on the inner face of each arm, and a pair of relatively movable members, a detent on one of said members and adapted to seat in said notches, both said members being vertically supported by said arms, and a cam on the other member adapted to engage said arms to spread them radially outward when the second mentioned member is moved upward relative to the first mentioned member.

2. A valve actuating device of the character described embodying a pair of oppositely disposed and downwardly extending arms mounted at their upper ends on an arm supporting body and adapted yieldingly to resist lateral displacement, said arms having a pair of oppositely disposed notches, one each on the inner face of each arm, a pair of relatively movable members, a detent on one of said members adapted to seat in said notches, both said members being vertically supported by said arms, a cam on the other member adapted to engage said arms to spread them radially outward when the second mentioned member is moved upward relative to the first mentioned member, and yielding means resisting said upward relative movement.

3. In a device of the character described, a vertically movable sleeve having a bore extending upward from its lower end, a pair of detents, one each at the upper and lower ends of the sleeve, an annular cam slidably mounted on said sleeve, a block slidably mounted in said bore and joined to the cam by means of a pin extending through the block and cam and through vertically extending slots in the bore wall, and counteracting yielding means adapted to resist upward and downward displacement of the cam and block relative to said sleeve.

4. A valve actuating device of the character described embodying a pair of oppositely disposed and downwardly extending arms mounted at their upper ends on an arm supporting body and adapted to yieldingly resist lateral displacement, said arms having a pair of oppositely disposed notches, one each on the inner face of each arm, a vertically movable sleeve, a pair of detents, one each on the upper and lower ends of the sleeve and adapted to seat in said notches when the sleeve is in its lowermost and uppermost positions, respectively, an annular cam slidably mounted on the sleeve, a block slidably mounted in said bore and joined to the cam, and counteracting yielding means resisting vertical movement of the cam and block relative to the sleeve, said cam being adapted to engage the arms when one of said detents is seated in the arm notches, to spread them radially outward and to release the detent from the notches to permit the sleeve to move vertically therebetween.

5. A device of the character described embodying a pair of oppositely disposed and downwardly extending arms mounted at their upper ends on an arm supporting body and having a pair of oppositely disposed slots, one each on the inner face of each arm, a pair of downwardly and inwardly inclined cam faces one each on each arm above said slots and a pair of downwardly and outwardly inclined cam faces one each on each arm below the slots, yielding means resisting lateral movement of said arms, a vertically movable sleeve having a bore extending upwardly from its lower end and having a pair of detents on its upper and lower ends, said detents being adapted to seat in said slots when the sleeve is respectively in its lower and upper positions, an annular cam slidably mounted on said sleeve and having upper and lower arm faces inclined correspondingly to the lower and upper cam faces, respectively, on said arms, a block slidably mounted in said bore and joined to said cam by means of a pin extending through the block and cam and through vertically extending slots in the bore wall, and counteracting yielding means adapted to resist upward and downward displacement of the cam and block relative to said sleeve.

6. In a fluid pressure operated well pump motor, a high pressure fluid conduit, a plunger, means forming a fluid passage for delivering fluid from said conduit to the plunger, means for controlling the flow of fluid to said plunger, said means comprising, a valve, a pair of relatively movable members, one joined to said valve and the other adapted to be actuated by the plunger, both said members being movable with the plunger, releasable means for locking the first mentioned member against movement with the plunger during a portion of its stroke, and the second mentioned member being adapted to actuate said locking means to release the first mentioned member for movement with the plunger during the remainder of its stroke, both said members being supported by said locking means.

7. In a fluid pressure operated well pump motor, a high pressure fluid conduit, a plunger, means forming a fluid passage for delivering fluid from said conduit to the plunger, means for controlling the flow of fluid to said plunger, said means comprising, a valve, a pair of relatively movable members, one joined to said valve and the other adapted to be actuated by the plunger, both said members being movable with the plunger, yielding means resisting relative movement of the members, releasable means for locking the first mentioned member against movement with the plunger during a portion of its stroke, and the second mentioned member being adapted to actuate said locking means to release the first mentioned member for movement with the plunger during the remainder of its stroke, both said members being supported by said locking means.

8. In a fluid pressure operated well pump motor, a high pressure fluid conduit, a plunger, means forming a fluid passage for delivering fluid from said conduit to the plunger, means for controlling the flow of fluid to said plunger, said means comprising, a valve, a pair of oppositely disposed and downwardly extending arms mounted at their upper ends on an arm supporting body and adapted to yieldingly resist lateral displacement, said arms having a pair of oppositely disposed notches, one each on the inner face of each arm, a vertically movable sleeve joined to said valve and having a bore extending upward from its lower end, a pair of detents on the upper and lower ends of the sleeve and adapted to seat in said notches when the sleeve is in its lowermost and uppermost positions, respectively, an annular cam slidably mounted on said sleeve, a block slidably mounted in said bore and joined to the cam, yielding means resisting relative movement between said cam and sleeve, and means for actuating said block by virtue of the plunger movement so that when one of said detents is seated in the arm notches, the cam is caused to engage said arms to spread them radially outward to release the detent and permit said sleeve and valve to move with the plunger until the other detent becomes engaged in the arm notches.

9. In a well pump, the combination comprising, a plunger, a master valve for controlling the flow of actuating fluid to the plunger and a pilot valve for controlling the movements of the master valve; a pair of relatively movable members, one joined to said pilot valve and the other adapted to be actuated by the plunger, both said members being movable with the plunger, releasable means for locking the first mentioned member and the pilot valve against movement with the plunger during a portion of its stroke, and the second mentioned member being adapted to actuate said locking means to release the first mentioned member and the pilot valve for movement with the plunger during the remainder of its stroke and thereby to actuate the master valve to control the flow of actuating fluid to the plunger on its return stroke, both said members being supported by said locking means.

10. In combination with a plunger, a master valve for controlling the flow of actuating fluid to the plunger and a pilot valve for controlling the movements of the master valve; a pair of oppositely disposed and downwardly extending arms mounted at their upper ends on an arm supporting body and adapted to yieldingly resist lateral displacement, said arms having a pair of oppositely disposed notches, one each on the inner face of each arm, a vertically movable sleeve joined to said valve and having a bore extending upward from its lower end, a pair of detents on the upper and lower ends of the sleeve and adapted to seat in said notches when the sleeve is in its lowermost and uppermost positions, respectively, an annular cam slidably mounted on said sleeve, a block slidably mounted in said bore and joined to the cam, yielding means resisting relative movement between said cam and sleeve, and means for actuating said block by virtue of the plunger movement so that when one of the detents is seated in the arm notches the cam is caused to engage said arms to spread them radially outward to release the detent and to permit said sleeve and the pilot valve to move with the plunger to the end of its stroke and until the other detent becomes engaged in the arm notches.

11. In a fluid operated well pump motor, the combination comprising, a valve head, high pressure and discharge fluid conduits leading downwardly to said valve head, a plunger barrel extending vertically below said valve head, a plunger in said barrel, fluid passages in the valve head communicating with said plunger, valve means for controlling the flow of fluid through said passages comprising a vertically reciprocating valve in said valve head, releasable means for locking the valve during both strokes of the plunger, and plunger controlled means for actuating said valve locking means near the ends of the plunger strokes to release the valve.

12. In a fluid operated well pump motor, the combination comprising, a valve head, high pressure and discharge fluid conduits leading downwardly to said valve head, a plunger barrel extending vertically below said valve head, a plunger in said barrel, fluid passages in the valve head communicating with said plunger, valve means for controlling the flow of fluid through said passages comprising a vertically reciprocating valve in said valve head, releasable means for locking the valve during both strokes of the plunger, and plunger controlled means for actuating said valve locking means near the ends of the plunger strokes to release the valve, the last mentioned means including means for moving the valve through at least a part of its stroke, by the plunger after the valve is released from said locking means.

13. In a fluid operated well pump motor, the combination comprising, a valve head, high pressure and discharge fluid conduits leading downwardly to said valve head, a plunger barrel extending vertically below said valve head, a plunger in said barrel, fluid passages in the valve head communicating with said plunger, valve means for controlling the flow of fluid through said passages comprising a vertically reciprocating valve in said valve head, a valve operating rod depending from the valve head into said barrel, releasable means for locking said rod during both strokes of the plunger, and plunger controlled means for actuating said locking means near the ends of the plunger strokes to release the valve rod.

14. In a fluid operated well pump motor, the combination comprising, a valve head, high pressure and discharge fluid conduits leading downwardly to said valve head, a plunger barrel extending vertically below said valve head, a plunger in said barrel, fluid passages in the valve head communicating with said plunger, valve means for controlling the flow of fluid through said passages comprising a vertically reciprocating valve in said valve head, a valve operating rod depending from the valve head into said barrel, a latch member mounted on said head and adapted to releasably lock said rod during both strokes of the plunger, and plunger controlled means for actuating said locking means near the ends of the plunger strokes to release the valve operating rod.

15. In a fluid operated well pump motor, the combination comprising, a valve head, high pressure and discharge fluid conduits leading downwardly to said valve head, a plunger barrel extending vertically below said valve head, a plunger in said barrel, fluid passages in the valve head communicating with said plunger, valve means for controlling the flow of fluid through said passages comprising a vertically reciprocating valve in said valve head, and a pair of relatively movable valve operating members, one joined to said valve and the other being adapted to be actuated by the plunger, releasable means for locking the first mentioned member during the plunger strokes, the second mentioned member being adapted to actuate said locking means to release the first mentioned member near the ends of the plunger strokes.

16. In a fluid operated well pump motor, the combination comprising, a valve head, high pressure and discharge fluid conduits leading downwardly to said valve head, a plunger barrel extending vertically below said valve head, a plunger in said barrel, fluid passages in the valve head communicating with said plunger, valve means for controlling the flow of fluid through said passages comprising a vertically reciprocating valve in said valve head, and a pair of relatively movable valve operating members, one joined to said valve and the other being adapted to be actuated by the plunger, yielding means resisting relative movement between said members, releasable means for locking the first mentioned member during the plunger strokes, the second mentioned member being adapted to actuate said locking means to release the first mentioned member near the ends of the plunger strokes.

17. In a fluid operated well pump motor, the combination comprising, a valve head, high pressure and discharge fluid conduits leading downwardly to said valve head, a plunger barrel extending vertically below said valve head, a hollow plunger in said barrel, fluid passages in the valve head communicating with said plunger, valve means for controlling the flow of fluid through said passages comprising a vertically reciprocating valve in said valve head, and a pair of relatively movable valve operating rods, one joined to said valve and the other depending within said plunger and being vertically movable thereby near the ends of the plunger strokes, releasable means for locking the first mentioned rod during the plunger strokes, the second mentioned rod being adapted to actuate said locking means to release the first mentioned rod.

18. In a fluid operated well pump motor, the combination comprising, a valve head, high pressure and discharge fluid conduits leading downwardly to said valve head, a plunger barrel extending vertically below said valve head, a plunger in said barrel, fluid passages in the valve head communicating with said plunger, valve means for controlling the flow of fluid through said passages comprising a vertically reciprocating valve in said valve head, a pair of relatively movable valve operating members, one joined to said valve and the other being adapted to be actuated by the plunger, and releasable means for locking the first mentioned member during the plunger strokes, comprising a latch mounted on said head and releasably holding said first mentioned member, the second mentioned member being adapted to actuate said latch to release the first mentioned member.

19. In a well pump, a valve head, a valve in said head, a latch member mounted on said head, and a pair of relatively vertically movable valve operating members, one of the members normally being locked by said latch, and the other being adapted to move vertically to actuate said latch to release the first mentioned member, both said members being vertically supported by the latch.

20. In a well pump, a valve head, a valve in said head, a latch mounted on said head, a pair of relatively vertically movable valve operating members, yielding means resisting their relative movement, one of the members normally being locked by said latch, and the other being adapted to move vertically to actuate said latch to release the first mentioned member, both said members being vertically supported by the latch.

ARTHUR G. GAGE.